US007001280B2

(12) United States Patent
Kudo

(10) Patent No.: US 7,001,280 B2
(45) Date of Patent: Feb. 21, 2006

(54) METHOD OF SWITCHING BACKGROUND IMAGES IN ACCORDANCE WITH MOVEMENT OF CHARACTERS, STORAGE MEDIUM FOR STORING PROGRAMS, AND VIDEO GAME DEVICE

(75) Inventor: Shinichi Kudo, Sapporo (JP)

(73) Assignee: Konami Co., Ltd., Tokyo (JP)

( * ) Notice: Subject to any disclaimer, the term of this patent is extended or adjusted under 35 U.S.C. 154(b) by 0 days.

(21) Appl. No.: 09/559,469

(22) Filed: Apr. 26, 2000

(65) Prior Publication Data

US 2002/0072417 A1 Jun. 13, 2002

(30) Foreign Application Priority Data

Apr. 27, 1999 (JP) .................................. 11-120756

(51) Int. Cl.
*A63F 13/00* (2006.01)
*A63F 9/24* (2006.01)
*G06F 17/00* (2006.01)
*G06F 19/00* (2006.01)
*G06T 13/00* (2006.01)

(52) U.S. Cl. ..................... 463/43; 463/1; 463/2; 463/7; 463/8; 463/31; 463/32; 273/440.1; 273/461; 345/619; 345/473; 345/475

(58) Field of Classification Search ............ 463/43–47, 463/30–37, 1, 2, 7, 8; 273/317.1, 148.4, 273/148.8, 108.1, 440.1, 456, 460, 461, 454, 273/148 R, 148 B; 345/112, 113, 114, 115, 345/116, 133, 141, 523, 646–649, 619, 473–475; 700/90, 91

See application file for complete search history.

(56) References Cited

U.S. PATENT DOCUMENTS

| 4,738,451 A | * | 4/1988 | Logg .................. 273/153 R X |
| 4,871,167 A | * | 10/1989 | Pasierb, Jr. ................... 463/31 |
| 5,357,604 A | * | 10/1994 | San et al. ..................... 463/31 |
| RE35,314 E | * | 8/1996 | Logg .......................... 463/2 X |
| 5,680,534 A | * | 10/1997 | Yamato et al. .......... 395/173 X |
| 5,720,663 A | * | 2/1998 | Nakatani et al. .............. 463/23 |
| 5,769,718 A | * | 6/1998 | Rieder ...................... 463/31 X |
| 5,827,120 A | * | 10/1998 | Kikuchi et al. ........... 463/40 X |
| 5,853,324 A |   | 12/1998 | Kami et al. |
| 5,880,709 A | * | 3/1999 | Itai et al. ................. 345/113 X |
| 6,001,017 A | * | 12/1999 | Okano et al. ............. 463/43 X |
| 6,155,923 A | * | 12/2000 | Stephens et al. ............... 463/1 |
| 6,340,330 B1 |   | 1/2002 | Oishi et al. |

FOREIGN PATENT DOCUMENTS

| JP | 08194833 A | 7/1996 |
| WO | WO 9815328 A | 4/1998 |

OTHER PUBLICATIONS

Street Fighter series by Yesterdayland Arcade Games (3 pages).*
The History of Street Fighter by Gamespot (16 pages).*
Capcom Street Fighter II by ArcadeFlyers (6 pages).*

* cited by examiner

Primary Examiner—Xuan M. Thai
Assistant Examiner—Binh-An D. Nguyen
(74) Attorney, Agent, or Firm—Sughrue Mion, PLLC

(57) ABSTRACT

On displaying, in a video game device, an image of a player character and images of non-player characters, together with one type of background image from at least two or more switchable types of background images, the background images are changed from one to another only while the player character disappears after completion of a particular operation mode.

7 Claims, 7 Drawing Sheets

METHOD OF SWITCHING BACKGROUND IMAGES IN ACCORDANCE WITH MOVEMENT OF CHARACTERS, STORAGE MEDIUM FOR STORING PROGRAMS, AND VIDEO GAME DEVICE

BACKGROUND OF THE INVENTION

1. Field of the Invention

The present invention relates to a display device for use in displaying characters and background images in a video game program and video game device, and more particularly, to an image display which is effectively operable in cases where a character is moving between scenes having mutually different backgrounds.

2. Description of the Related Art

With increases in hardware processing capacity, there has been a steady improvement in image quality in all game software over recent years. In general, improved image quality signifies an increase in the quantity of image data. This means that a waiting time tends to become long during transferring data from an external storage device to a memory.

A waiting time of this type does not practically cause any serious problem to occur in some sorts of games, such as a chess game, a strategic simulation game, executed in accordance with video game programs. This is because real-time manipulation of a player is not directly concerned with results of such games, although absence of any waiting time is ideal in such games also. In other words, such a waiting time adversely and significantly does not affect the result of such games.

In contrast to these games, in games, such as action games, the realtime reactions of the player have a significant effect on the result of the game. In consequence, any waiting time seriously and directly influences a result of the game because the rhythm of the player's input operations is turbulent due to the waiting time. This may cause significant stress to the player.

In particular, many of the typical domestic video game devices of recent years use an optical disk, such as a CD-ROM, as a storage medium. However, such optical disks have a slow data reading speed as compared to other external storage devices, such as a fixed magnetic disk device, or the like. Such optical disks are therefore particularly susceptible to the problem described above.

Herein, consideration is made about a case where the background changes due to the fact that a character has moved from in front of the current background to an adjacent background. Then if it is supposed that all of the backgrounds in the directions to which the character could possibly move have been previously read in from an external storage device, the aforementioned waiting time will not arise, whatever direction the character moves in.

However, if high-quality background images are being used, as in current games, then the amount of background image data will inevitably increase, and it therefore becomes impossible to transfer all of the adjacent background images previously into a limited RAM space. Consequently, if the character is about to move forwards from the end region of a screen, it is necessary to switch between background images, and this requires the external storage device to be accessed.

SUMMARY OF THE INVENTION

In view of the foregoing, the object of the present invention is to provide an image display method, storage medium and video game device, whereby the occurrence of waiting time associated with reading from an external storage device can be reduced, especially in the case of fighting scenes in action games, where real-time response is a particularly important requirement.

In order to achieve the foregoing object, the present invention provides an image display method, storage medium and video game device as described below.

The present invention provides an image display method of displaying an image of a player character and images of non-player characters, together with one type of background image from at least two or more switchable types of background image, in a video game device, comprising the steps of: predetermining a plurality of operational modes which may be assumed by the player character, and preparing an image corresponding to each operational mode; displaying an image of the player character corresponding to any one of the plurality of operational modes and images of the non-player characters, simultaneously with any one of the background images; and restricting the changing of the background images from the start until the completion of a predetermined particular operational mode of the plurality of operational modes. By means of this image display method, since changing of the background images is restricted during a particular operational mode, by setting this particular operational mode to be an operational mode wherein the player demands operation having good real-time characteristics, it is possible to excite the player more and more without being bothered by time required for storage medium reading operations.

This method is suitable for the video game displaying an image of a player character with a weapon. In the video game, the player character has plural operational modes including a fighting mode and a moving mode. The fighting mode represents a state wherein the player character is able to fight by the use of the weapon and is set as the particular operational mode. The moving mode represents a state wherein the character moves whilst carrying the weapon.

Moreover, the present invention provides a computer-readable storage medium storing an image display program for displaying an image of a player character and images of non-player characters, together with one type of background image from at least two or more switchable types of background image, in a video game device, comprising: a region storing images corresponding respectively to a plurality of predetermined operational modes which can be adopted by the player character; and a region storing an image display program for causing a video game device to implement processing for displaying an image of a player character corresponding to any one of the plurality of operational modes and images of non-player characters, simultaneously with any one of the background images, and processing for restricting the changing of the background images from the start until the completion of a predetermined particular operational mode of the plurality of operational modes. By means of the image display program stored on this storage medium, since changing of background images is restricted during a particular operational mode, by setting this particular operational mode to be an operational mode wherein the player demands operation having good real-time characteristics, the player is able to absorb himself or herself in the game, without being bothered by time required for storage medium reading operations.

By determining the amount of information relating to each of the background images on the basis of the video RAM capacity of the video game device, it is possible to display high-quality images whilst suppressing the occurrence of storage medium reading operations.

It is beneficial if the image of the player character is an image displaying the player character in a state where it is carrying a weapon, and if the plurality of operational modes include a fighting mode representing a state wherein the player character is able to fight using the weapon, and a moving mode representing a state wherein the character moves while carrying the weapon, the fighting mode being set as the particular operational mode.

The present invention is particularly beneficial if an image display program of this kind is incorporated in a portion of a game program. Furthermore, the present invention is also particularly beneficial in the case of a storage medium requiring a relatively long reading time, such as an optical disk. A storage medium of this kind may be contained inside a video game device.

DESCRIPTION OF THE PREFERRED EMBODIMENTS

Initially, the hardware structure of a video game device 100 suitable for implementing the video game program relating to the present invention will be described. The video game device 100 reads game programs and data out of a storage medium, such as an optical disk, or the like, and outputs images and sound to a player. The player performs operational inputs or manipulations by the use of a controller.

Figure 1:
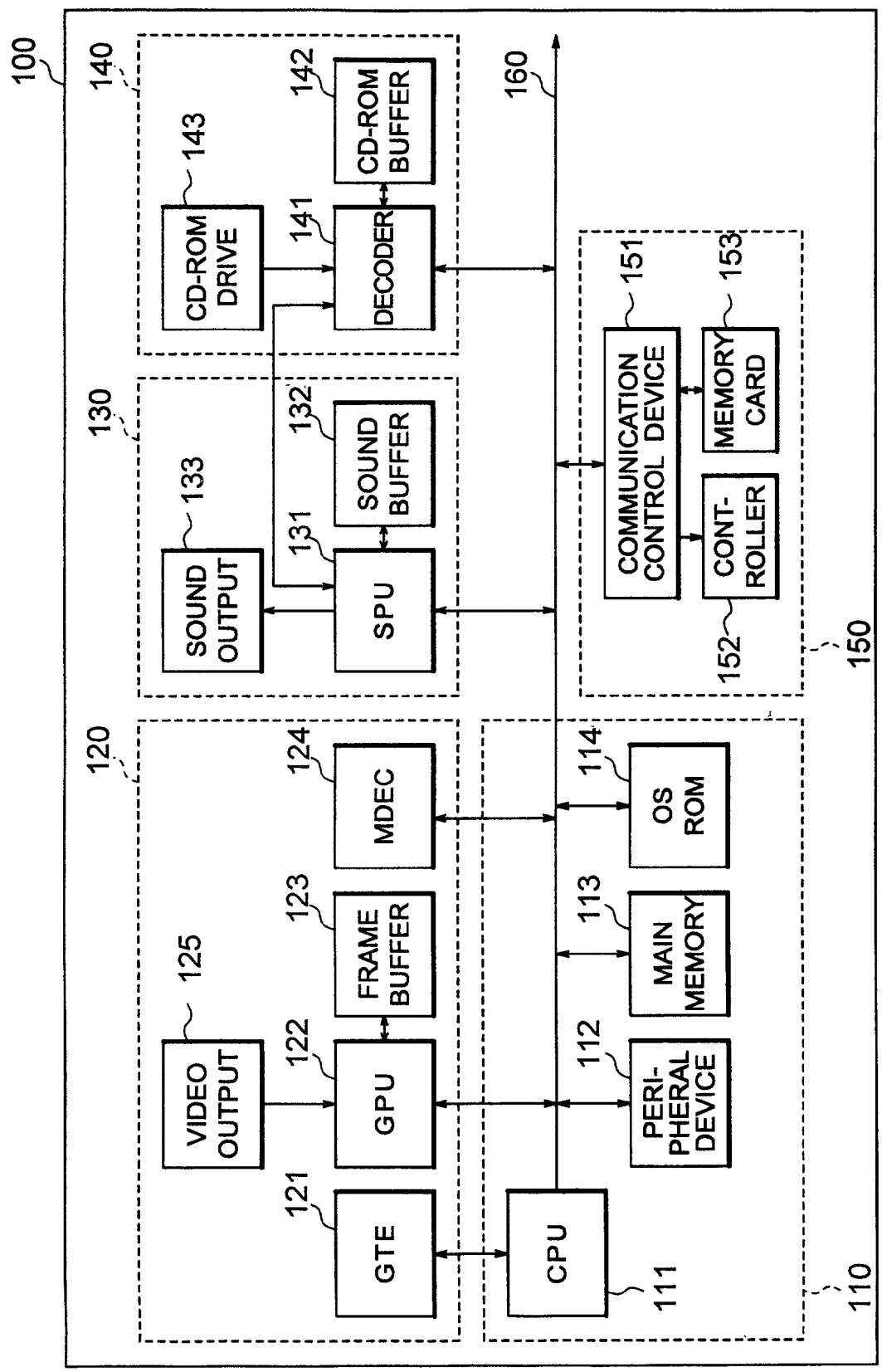
FIG. 1 is a functional block diagram showing a compositional example of a video game device suitable for implementing a video game relating to the present invention.

The general composition of the video game device 100 is described with reference to FIG. 1. The video game device 100 comprises: a control section 110 for controlling the operation of the whole device; an image processing section 120 for carrying out processing relating to image display: a sound processing section 130 for carrying out processing relating to sound output; an auxiliary storage control section 140 for reading out game programs and data of various types from a storage medium; a communications control section 150 for reading and writing data, such as operations performed by the player, game settings, game progress status, and the like, and controlling the input and output of other data; and a main bus 160 connected between the aforementioned control section 110 and the communications control section 150.

Next, description will be directed to internal constitution from the control section 110 to the communication control section 150.

The control section 110 comprises: a CPU 111; a peripheral device controller 112 for performing various control operations, such as interrupt control, time control, memory control, direct memory access (DMA) transfer, and the like; a principal storage device (main memory) 113 consisting of a RAM; and a ROM 114 storing programs such as an operating system (OS) for managing the main memory 113, image processing section 120, sound processing section 130, and the like.

The CPU 111 controls the whole device by executing an OS stored in the ROM 114. Furthermore, the CPU 111 is also provided with a command cache and scratch pad memory, and it manages the actual memory.

The image processing section 120 comprises: a geometry transfer engine (GTE) 121; a graphics processing unit (GPU) 122 for performing drawing operations in accordance with drawing commands from the CPU 111; a frame buffer 123 for storing images drawn by the GPU 122; an image decoder (MDEC) 124 for decoding image data that has been orthogonally converted by so-called discrete cosine transform, or the like, and then compressed and converted; and a video output section 125, such as a display device, or the like.

The sound processing section 130 comprises: a sound reproduction processor (SPU) 131 for generating sounds, on the basis of commands from the CPU 111, a sound buffer 132 for storing sound and music data, sound source data, and the like, read out from a CD-ROM; and a sound output section 133, such as an amplifier and a speaker, for outputting the sounds generated by the SPU 131.

The auxiliary storage control section 140 comprises: a CD-ROM drive device 143 for reproducing programs, data, and the like, stored on a CD-ROM disk; a decoder 141 for decoding programs, data, and the like, that has been stored by appending error correction (EC) codes; and a CD-ROM buffer 142 for temporarily storing reproduced data from the CD-ROM drive device 143. The communications control section 150 comprises: a communications control device 151 for controlling communication with the CPU 111 via a main bus 160; a controller 152 for inputting commands from a user; and a memory card 153, which is a readable and writeable storage medium storing game settings, and the like.

Next, the general operation of the video game device 100 will be described.

When the power supply of the video game device 100 is switched on, the OS stored in the ROM 114 is executed by the CPU 111 and controls the image processing section 120 and sound processing section 130, and the like. Firstly, the OS performs an initialization procedure, involving operational verification, and the like, for the whole device, whereupon it controls the auxiliary storage control section 140 and executes a game program stored on a CD-ROM accommodated in the CD-ROM drive device 143. Next, the CPU 111 controls the image processing section 120, sound processing section 130, and the like, in accordance with the executed game program and the inputs made by the player via the controller 152.

As a result, images are displayed by the video output section 125, whilst sounds, such as sound effects, music, and the like, are output from the sound output section 133. If there is a temporary pause in the game, the current game progress status is written to the memory card 153 as saved data. When the interrupted game is restarted, this saved data is read from the memory card 153 into the main memory 113 and the corresponding game progress status is recreated.

Next, a video game representing one embodiment of the present invention is described. The video game in the example described below principally displays and develops screens representing a player character, non-player characters and background looked downwards from an oblique upward position. The player character and the non-player characters carry weapons, such as swords, or the like, and they fight with one another by using these weapons. In a so-called samurai game, to use the latest expression, a fight involving one (player character) against many (non-player characters) is performed. In the present specification, the player character is a character operated in accordance with inputs from the input device of the video game device, and the non-player characters are characters whose operation is predetermined by the game program.

A whole game comprises a number of different stages, and each stage forms a single story. Moreover, each stage is made up of many different scenes. Each scene has a background corresponding to a single theme, and the size of the background image is such that it can be read out from the CD-ROM drive 143 in a single reading operation.

The player character moves through a scene against this background, in accordance with the operational inputs from the controller 152. There are two operating modes for the player character: 1) a fighting mode representing a state where the character is able to fight using its weapon, and 2) a moving mode representing a state wherein the character is able to move carrying its weapon.

Herein, consideration will be made about an example wherein the player character is carrying a Japanese samurai sword. In the moving mode, the player character enters the sword in its scabbard and is put into a state where it cannot grasp the haft thereof. In fighting mode, the player character often draws the sword out of the scabbard in order to perform repeated attacks at any times. The fighting mode represents a state wherein the character is able to launch repeated attacks instantaneously. Therefore, if the player character uses a so-called 'quick draw' technique and then the blade of the sword, of which the haft is held by the character may be kept in the scabbard. This switching of operational modes is assigned to a prescribed push button switch on the controller 152, and is implemented according to the operational inputs performed by the player.

Figure 2:
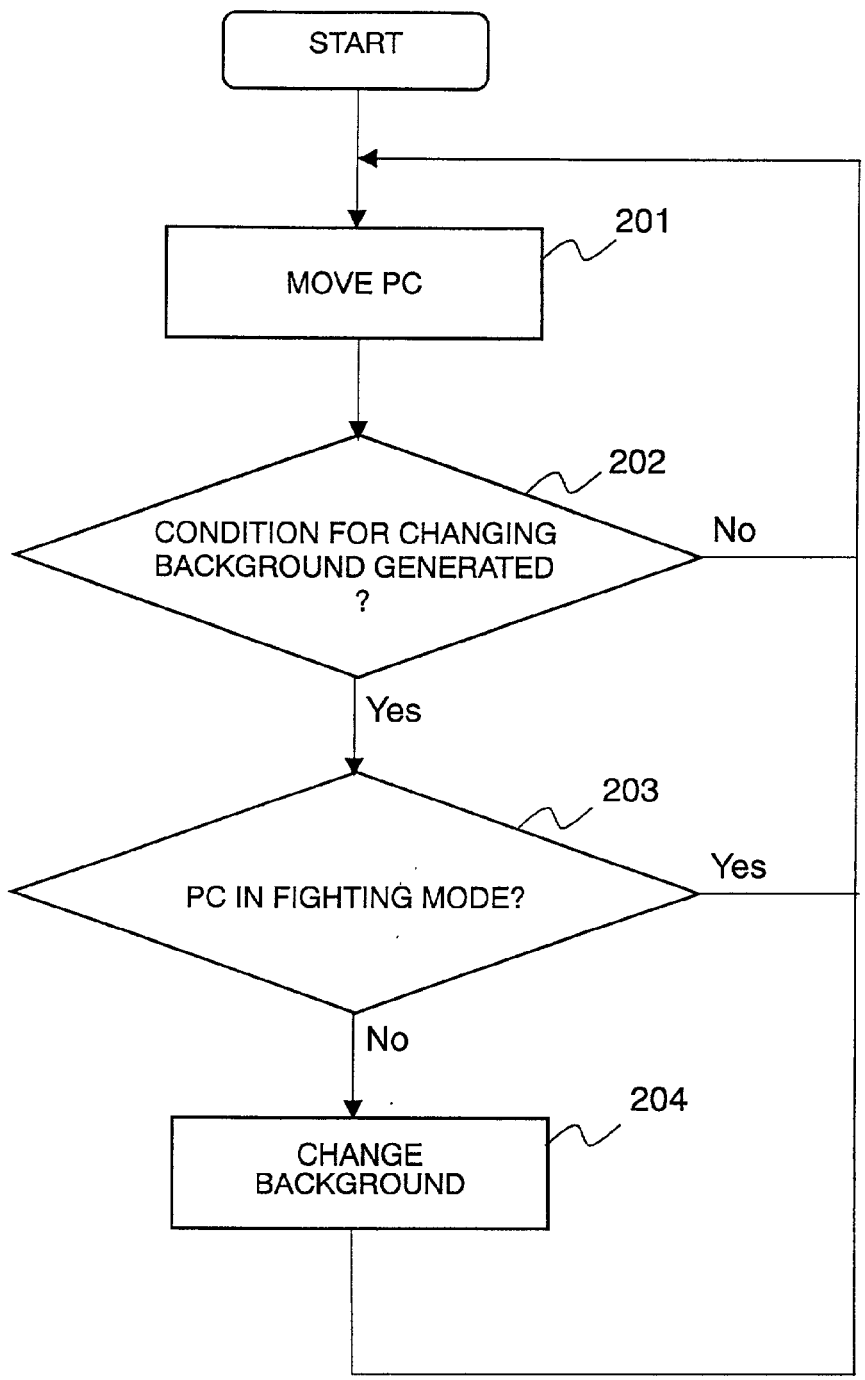
FIG. 2 is a flowchart illustrating a procedure for changing backgrounds in a video game according to one embodiment of the present invention.
Figure 3:
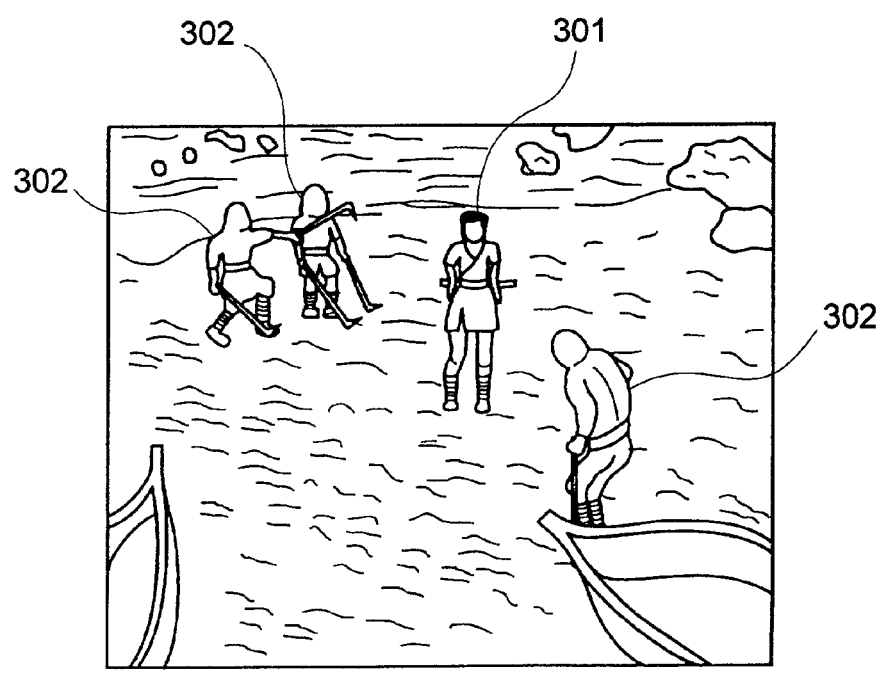
FIG. 3 is an example of a screen display in moving mode.
Figure 4:
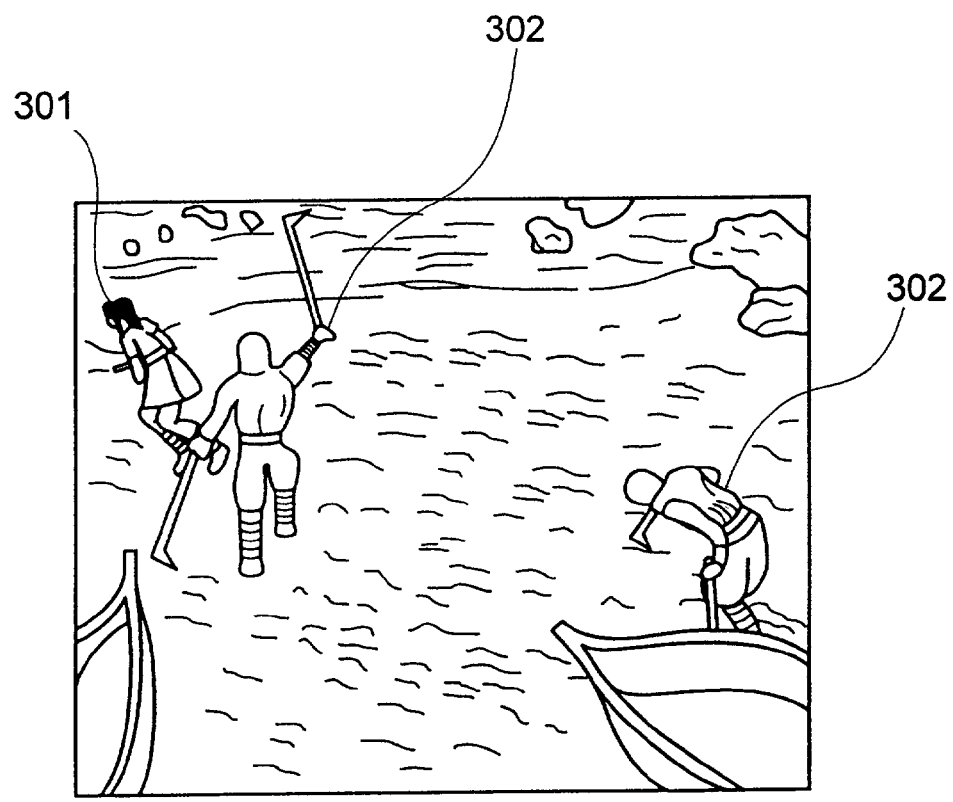
FIG. 4 is an example of a screen display in moving mode.

An overview of the procedure for switching backgrounds in a video game relating to the present invention is now described with reference to FIG. 2. If, during the movement of a player character (PC) (step 201), a condition for changing a predetermined background is generated (step 202), then the operational mode of the player character is determined (step 203). Here, a condition for changing the background is, for example, the condition of whether or not the player character has entered a boundary region between scenes, as described above.

Figure 5:
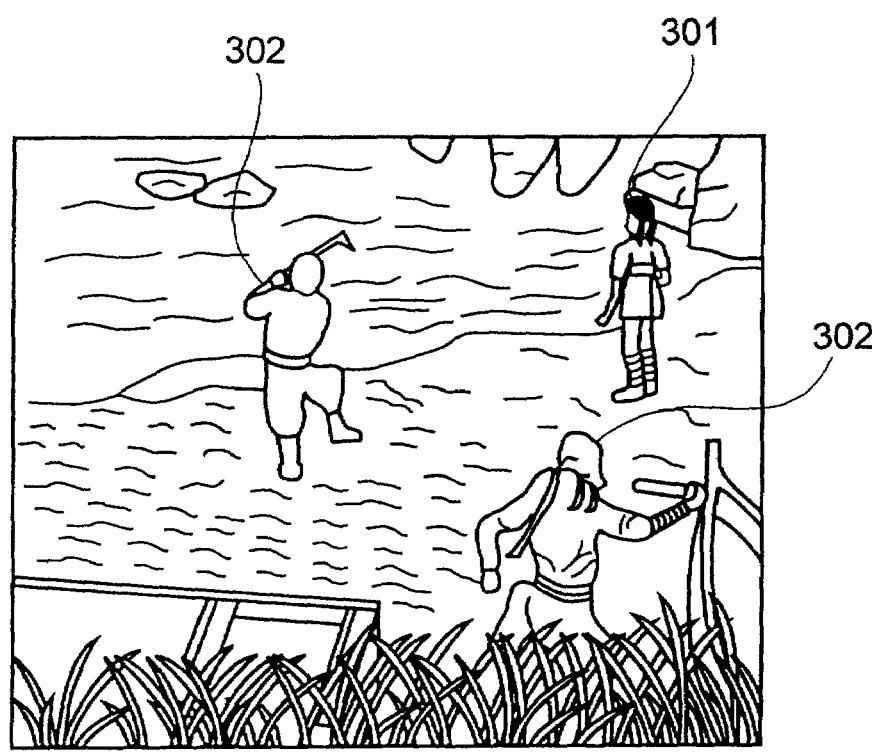
FIG. 5 is an example of a screen display after movement to an adjacent scene.
Figure 6:
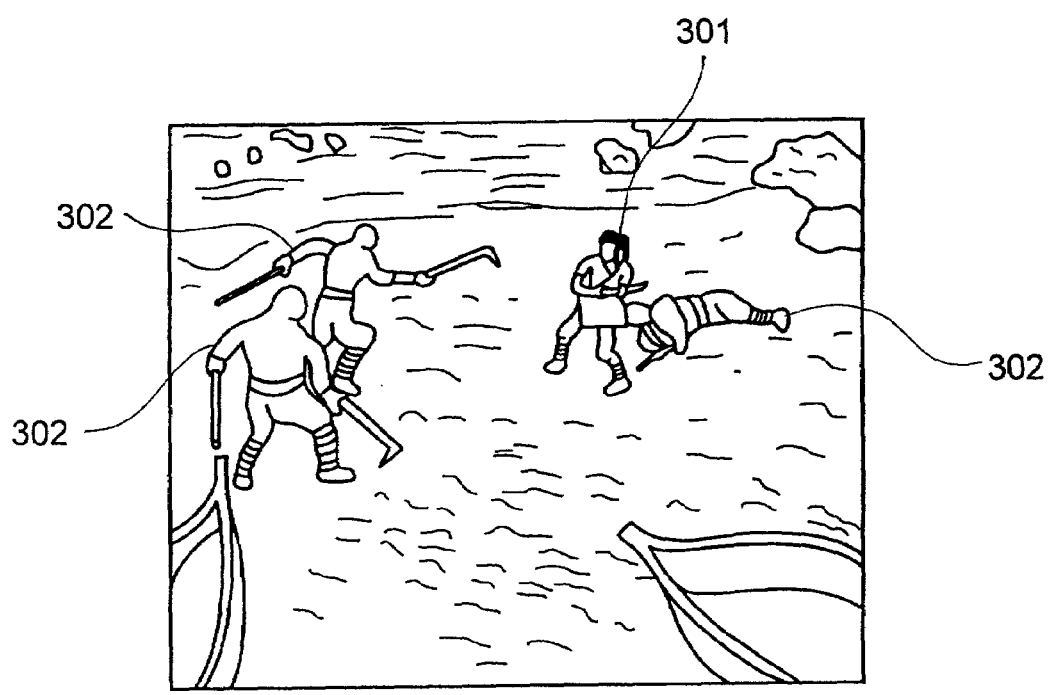
FIG. 6 is an example of a screen display in fighting mode.
Figure 7:
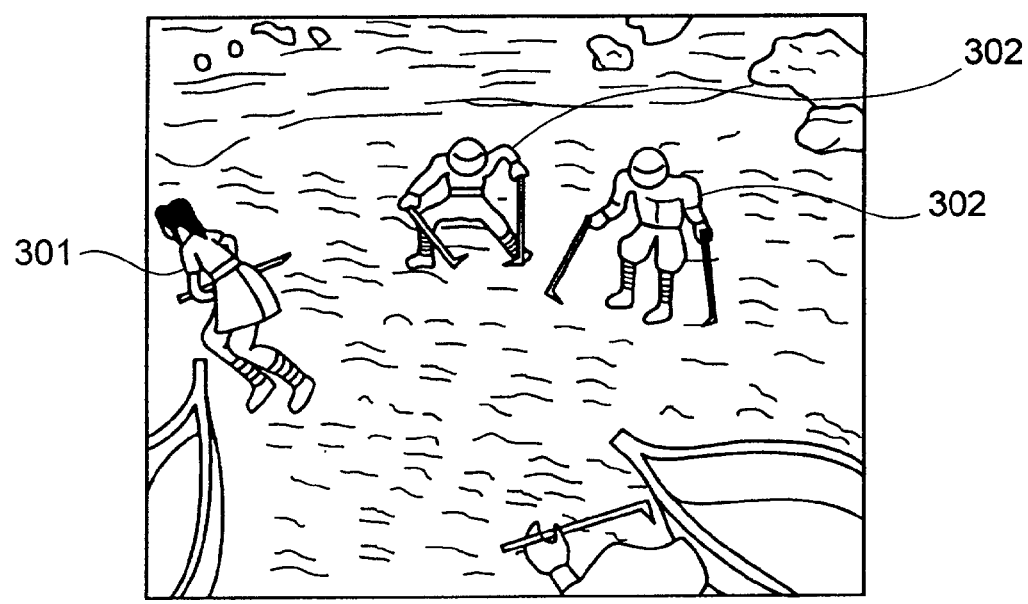
FIG. 7 is an example of a screen display in fighting mode.

The differences in image display at the scene-to-scene boundary regions between moving mode and fighting mode are now described with reference to FIGS. 3–7. Furthermore, FIGS. 3, 4, 6 and 7 are scenes before movement, and FIG. 5 depicts a scene after movement. In these figures, 301 denotes a player character and 302 denotes a non-player character.

If it is assumed that the operational mode is put into a moving mode (FIG. 3) and the player character 301 has entered a scene-to-scene boundary region (FIG. 4) and is about to move further into the subsequent adjacent scene, then the CD-ROM drive 143 reads background image data for the new scene from the CD-ROM, and hence a data reading time occurs.

In contrast to this, if it is assumed that the operational mode is put into a fighting mode (FIG. 6) and the player character 301 has entered a scene-to-scene boundary region (FIG. 7), then the scene is not switched and the background remains the same even if the player character 301 moves further in the leftward direction on the screen. Therefore, no CD-ROM reading time occurs.

According to the present invention, since the range of movement of a player character is restricted in accordance with the operational mode of the player character, it is possible to prevent the occurrence of external storage device reading operations during fighting scenes which have the greatest sense of urgency in a game. Thereby, the present invention is beneficial in that it makes it possible to relieve and eliminate the stress caused to the player by the occurrence of external storage device reading operations during a game.

In the foregoing, the present invention has thus far been described with reference to an embodiment, but it is possible for those skilled in the art to put the present invention into practice in various other manners without being restricted to the above-mentioned embodiment.

What is claimed is:

1. A method of displaying, in a video game device, an image of a player character and images of non-player characters, together with one type of background image from at least two or more switchable types of background images that display scene adjacent to each other in location, where the switching between background images requires a finite and unacceptable delay, comprising the steps of:
   predetermining a plurality of operational modes which are assigned to said player character, and preparing an image corresponding to each operational mode;
   displaying an image of the player character corresponding to any one of said plurality of operational modes together with images of said non-player characters, simultaneously with any one of said background images;
   restricting the switching of said background images from the start until the completion of a predetermined particular operational mode of said plurality of operational modes so that a finite and unacceptable delay is avoided; and
   switching said background images from one to another in response to manipulation of an input device of the video game device after the completion of the predetermined particular operational mode,
   wherein the image of said player character is an image displaying said player character in a state where it is carrying a weapon,
   said plurality of operational modes include a fighting mode representing a state wherein said player character is able to fight using said weapon, and a moving mode representing a state wherein said character moves whilst carrying said weapon, and
   said fighting mode is set as said particular operational mode, and
   wherein said character is unable to fight using said weapon in the moving mode.

2. The method according to claim 1, wherein the amount of information relating to each of said background images is determined on the basis of the video RAM capacity of said video game device.

3. A computer-readable storage medium storing an image display program for displaying an image of a player character and images of non-player characters, together with one type of background image from at least two or more switchable types of background image that display scenes adjacent to each other in location, where the switching between background images requires a finite and unacceptable delay, in a video game device, comprising:

a region storing images corresponding respectively to a plurality of predetermined operational modes which can be adopted by said player character; and a region storing an image display program for causing a video game device to implement processing for displaying an image of a player character corresponding to any one of said plurality of operational modes together with images of non-player characters, simultaneously with any one of said background images, processing for restricting the switching of said background images from the start until the completion of a predetermined particular operational mode of said plurality of operational modes so that a finite and unacceptable delay is avoided, and processing for switching said background images from one to another in response to manipulation of an input device of the video game device after the completion of the predetermined particular operational mode, wherein the image of said player character is an image displaying said player character in a state where it is carrying a weapon, said plurality of operational modes include a fighting mode representing a state wherein said player character is able to fight using said weapon, and a moving mode representing a state wherein said character moves whilst carrying said weapon, and said fighting mode is set as said particular operational mode, and wherein said character is unable to fight using said weapon in the moving mode.

4. The storage medium according to claim 3, wherein the amount of information relating to each of said background images is determined on the basis of the video RAM capacity of said video game device.

5. A storage medium storing a game program incorporating an image display program that provides switchable background images, where the switching between background images requires a finite and unacceptable delay, the image display program comprising the steps of:

predetermining a plurality of operational modes which are assigned to a player character, and preparing an image corresponding to each operational mode;

displaying an image of the player character corresponding to any one of said plurality of operational modes together with images of non-player characters, simultaneously with any one of background images that display scenes adjacent to each other in location;

restricting changing of said background images from the start until the completion of a predetermined particular operational mode of said plurality of operational modes so that a finite and unacceptable delay is avoided; and switching said background images from one to another in response to manipulation of an input device of the video game device after the completion of the predetermined particular operational mode wherein the image of said player character is an image displaying said player character in a state where it is carrying a weapon, said plurality of operational modes include a fighting mode representing a state wherein said player character is able to fight using said weapon, and a moving mode representing a state wherein said character moves whilst carrying said weapon, and said fighting mode is set as said particular operational mode, and wherein said character is unable to fight using said weapon in the moving mode.

6. An optical disk storing a game program incorporating an image display program that provides switchable background images, where the switching between background images requires a finite and unacceptable delay, the image display program comprising the steps of:

predetermining a plurality of operational modes which are assigned to a player character, and preparing an image corresponding to each operational mode;

displaying an image of the player character corresponding to any one of said plurality of operational modes together with images of non-player characters, simultaneously with any one of background images that display scenes adjacent to each other in location;

restricting changing of said background images from the start until the completion of a predetermined particular operational mode of said plurality of operational modes so that a finite and unacceptable delay is avoided; and switching said background images from one to another in response to manipulation of an input device of the video game device after the completion of the predetermined particular operational mode wherein the image of said player character is an image displaying said player character in a state where it is carrying a weapon, said plurality of operational modes include a fighting mode representing a state wherein said player character is able to fight using said weapon, and a moving mode representing a state wherein said character moves whilst carrying said weapon, and said fighting mode is set as said particular operational mode, and wherein said character is unable to fight using said weapon in the moving mode.

7. A video game device internally comprising the storage medium storing a game program incorporating an image display program that provides switchable background images, where the switching between background images requires a finite and unacceptable delay, the image display program comprising the steps of:

predetermining a plurality of operational modes which are assigned to a player character, and preparing an image corresponding to each operational mode;

displaying an image of a player character corresponding to any one of said plurality of operational modes together with images of non-player characters, simultaneously with any one of background images that display scenes adjacent to each other in location;

restricting changing of said background images from the start until the completion of a predetermined particular operational mode of said plurality of operational modes so that a finite and unacceptable delay is avoided; and switching said background images from one to another in response to manipulation of an input device of the video game device after the completion of the predetermined particular operational mode wherein the image of said player character is an image displaying said player character in a state where it is carrying a weapon, said plurality of operational modes include a fighting mode representing a state wherein said player character is able to fight using said weapon, and a moving mode representing a state wherein said character moves whilst carrying said weapon, and said fighting mode is set as said particular operational mode, and wherein said character is unable to fight using said weapon in the moving mode.

* * * * *